Oct. 22, 1957    J. S. KNIGHT    2,810,381
HUMIDIFIER UNITS FOR HOT AIR FURNACES
Filed Oct. 27, 1955
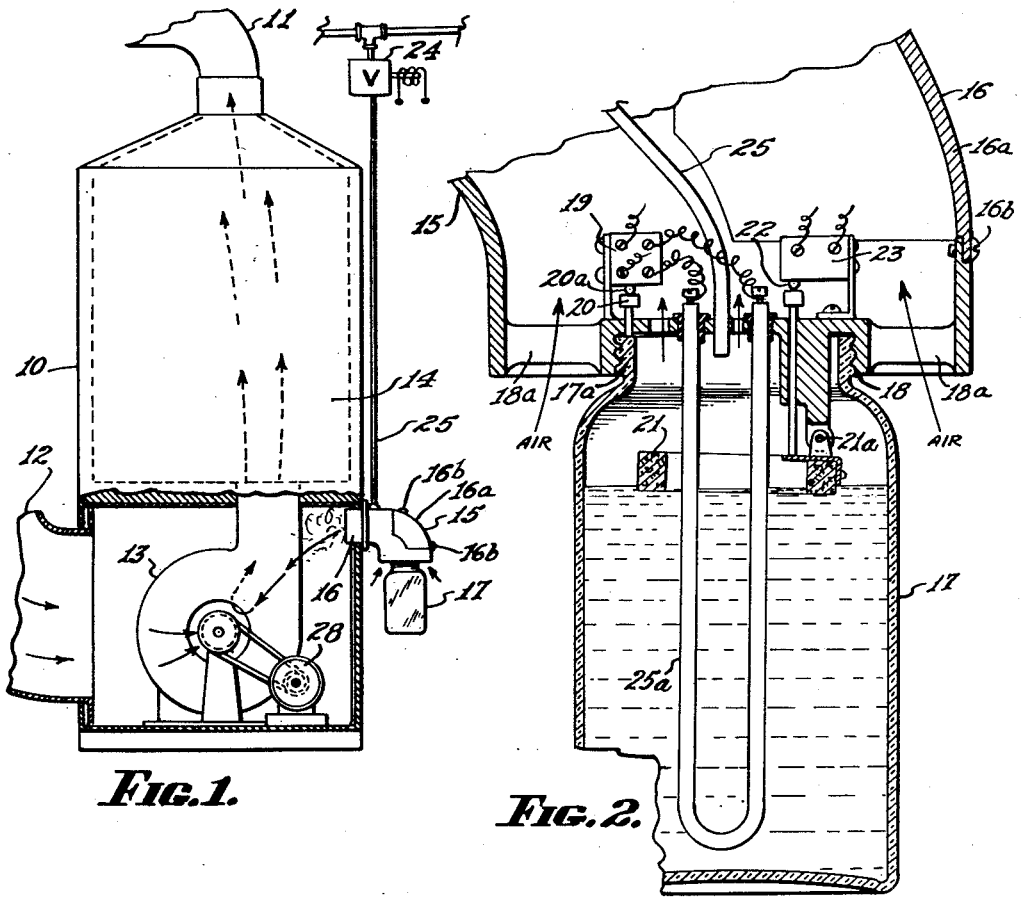
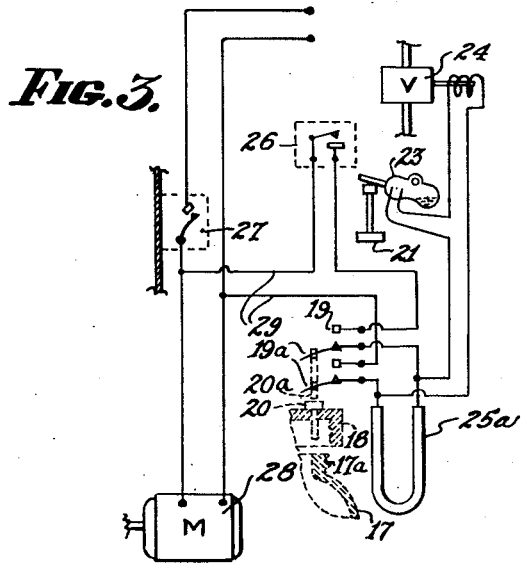
INVENTOR.
JAMES S. KNIGHT,
BY
ATTORNEYS.

United States Patent Office 2,810,381
Patented Oct. 22, 1957

2,810,381

HUMIDIFIER UNITS FOR HOT AIR FURNACES

James S. Knight, Cincinnati, Ohio

Application October 27, 1955, Serial No. 543,160

3 Claims. (Cl. 126—113)

It is an object of my invention to provide a humidifier unit independent of the hot air furnace in conjunction with which the humidifier functions which will closely control the humidity, either manually or automatically, and which will cause the precipitates inherent to the evaporation of water to form in a transparent container, in an accessible location.

It has been my experience with humidifiers now being sold as parts of hot air furnaces that the humidifiers are arranged to utilize the heat of the furnaces. It seems to have been adopted as an axiomatic principle that the heat required for evaporating the water for a humidifier must be provided at no additional cost and thus it has been customary to place a water tank within the furnace in the heating chamber.

With the positioning of a pan of water with suitable baffles in the hot air space over the heat exchanger, the water level is maintained by a float operated valve usually located in a separate chamber or pan.

The evaporator pan, being within the furnace itself, over the dome of the heat exchanger deteriorates rapidly. Precipitates from the water accumulate within a very short time and are difficult to remove due to the inconvenient location of the evaporator and the large area involved.

The precipitates form in the evaporator pan, on the baffles, in the pipe connecting the evaporator pan with the float chamber, in the float chamber and on the float valve itself. This results in the overflow pipe clogging, the float valve sticking and water often overflows the evaporator pan and runs down over the heat exchanger inside the furnace often causing much damage before it is detected.

The humidity in such units can only be controlled by removing baffles or otherwise changing the evaporating area or by turning off the water.

It is the object of my invention to provide a humidifying unit which solves all these problems of boiler scale and provides additional advantages not heretofore available.

My invention involves acceptance of the concept that the additional cost of vaporizing the water independent of the furnace heat much more than compensates for the cost of this heat by more accurate control and the provision of a unit which avoids all the disadvantages present in furnace contained humidifying apparatus.

Specifically my invention has unique characteristics in that:

(1) The entire unit mounts on the outside of the furnace and is independent of the furnace for its source of heat.

(2) All precipitates form in a glass jar which can be readily observed and readily cleaned and economically replaced.

(3) The water level control valve is electrically operated, is remote from evaporating area and consequently not subject to fouling.

(4) Power failure renders the unit inoperative and shuts off water supply.

(5) A remotely possible failure which might cause overflow, would merely wet the basement floor.

(6) Being completely outside of the furnace, the unit is not subject to the extreme heat which, through the formation of boiler scale, contributes to the deterioration of other units.

(7) The unit is capable of either manual or full automatic operation.

(8) Water vapor is produced and controlled electrically, rather than by the heat of the furnace itself. This permits the control of humidity within very close limits.

(9) There is no lag between the time the unit turns off and the time it ceases to produce water vapor. (Pan type units must evaporate several quarts of water after being turned off.)

(10) As the unit does not depend on the heat of the furnace for evaporation, it may remain inactive while the furnace runs at full capacity.

(11) Although completely independent of the furnace it is so connected to the blower circuit of the furnace that no water vapor is produced until the blower is in operation to distribute such vapor.

(12) The removal of the water jar disconnects all electrical circuits, shutting off water and leaving the unit in safe condition.

(13) The unit can be built in various sizes with heating elements suited to the application.

(14) With the addition of a fan or blower the unit may be made completely independent, for use with other types of heating systems.

Referring now to the particular modification shown in the drawings which illustrates the principle of my invention:

Figure 1 is a sectional view of a hot air furnace (diagrammatically shown) with various parts in section showing how my new humidifying unit may be conveniently mounted.

Figure 2 is an enlarged sectional view of the humidifying unit.

Figure 3 is a wiring diagram of a typical electrical control system.

Referring to Figure 1, a heating unit which may be a conventional furnace fired by coal, gas, or oil, is indicated at 10, and has the usual heat distribution pipes 11, cold air intake 12, blower 13, and heat exchange chamber 14. The new humidifying unit generally indicated at 15, is arranged to introduce steam or water vapor into the air stream as may be necessary. The device 15 includes a suitable fitting or head 16 adapted to direct steam generated in a container 17 into the air stream of the heating system. As shown, the head 16 comprises an arcuate cover plate 16a removably retained as by screws 16b, while the container 17 comprises a transparent jar having a threaded mouth 17a.

As best seen in Figure 2, the container 17 is removably mounted in the fitting 16 by suitable means such as the threaded socket indicated at 18. The socket 18 is supported in concentric spaced relation to the rim of the fitting 16 by means of circumferentially spaced supporting elements such as indicated at 18a. A switch 19, the movable elements of which comprise resilient blades 19a normally inclined to open position, is shifted to closed position upon insertion of the jar 17 within the socket 18, by means of a slidable pin 20, which engages the switch actuating element 20a. If, as shown in Figure 3, the container 17 is removed the pin 20 will move downward allowing the switch 19 to open and the heating element 25a and the solenoid actuated valve 24 will be rendered inoperative as will presently be more clear.

Arranged within the container 17, a float member 21, pivotally mounted at 21a, actuates a slidable rod 22 adapted to open or close a switch 23. As the water level recedes, the switch 23 will be closed, thus completing a circuit to a solenoid actuated valve 24 (Figs. 1 and 3). This allows water to flow through the line 25 to re-establish the water level until the float 21 again opens the switch 23. A suitable heating element 25a is arranged to vaporize the water. A humidity sensitive switch 26 may be employed in the circuit, or if preferred, this switch may be manually operated.

Looking now at the wiring diagram of Figure 3, when the furnace temperature reaches a certain predetermined level, a thermostatically controlled switch 27 closes a circuit to the blower motor 28, this of course, being standard practice. Upon energization of the motor 28 current is available in the lines 29 and my device may then be operated to add humidity as required to the air stream. Upon closure of the switch 26, the heating element 25a will be energized to vaporize the water, provided, of course, that the jar 17 is fully in place within the socket 18. As the water level recedes the switch 23 will be actuated to replenish the supply of water.

It will be observed that the device operates only at times when the blower 28 is in operation, and also that the device will be rendered inoperative if the switch 19 is opened as by removal of the water container 17.

Having thus described my invention, what I claim as new and desire to secure by Letters Patent is:

1. In a heating system of the type comprising a heat exchange having a surrounding casing in connection with warm air distributing channels including a blower to force air through said channels and a basic electrical circuit adapted to energize and deenergize said blower; a humidifier comprising an L-shaped tubular member serving as a duct and as a mixing chamber for air and water vapor, said L-shaped member having an outlet and extending into said casing and having an inlet end comprising circumferentially spaced elements, a container supporting member carried by said spaced elements, a water container detachably mounted on said container supporting member, an electrical heating element mounted on said container supporting member and extending downwardly into said water container, a second electrical circuit connected to and dependent for energization upon said first mentioned basic electrical circuit and adapted to energize and deenergize said heating element in parallel with said blower, a safety switch in said second electrical circuit comprising resilient means normally urging its contacts to open position and having an actuating element operable to shift its contacts to closed position, and a movable element arranged to press against said switch actuating element while said water container is retained in its normally mounted position with respect to said container supporting member.

2. A device as defined in claim 1 wherein said safety switch is mounted on said container supporting member and said movable element arranged to press against said switch actuating element comprises a pin slidably positioned in said container supporting member between said switch actuating element and the upper rim of said container.

3. A device as defined in claim 2 including a source of water supply directed to replenish said water container, a solenoid actuated valve for controlling flow of said water supply, a float operated switch which closes its contacts as water recedes in said water container, a third electrical circuit including said float actuated switch and said solenoid actuated valve, said third electrical circuit also being connected to and dependent for energization upon said first mentioned basic electrical circuit.

References Cited in the file of this patent

UNITED STATES PATENTS

| | | |
|---|---|---|
| 1,625,034 | Lawner | Apr. 19, 1927 |
| 2,232,347 | Stuart | Feb. 18, 1941 |
| 2,238,108 | Gates | Apr. 15, 1941 |
| 2,347,490 | Legeman | Apr. 25, 1944 |
| 2,584,650 | Woodruff | Feb. 5, 1952 |